United States Patent [19]

Broadwater

[11] Patent Number: 4,478,783
[45] Date of Patent: Oct. 23, 1984

[54] NUCLEAR POWER PLANT FEEDWATER CONTROLLER DESIGN

[75] Inventor: Robert P. Broadwater, Lynchburg, Va.

[73] Assignee: The Babcock & Wilcox Company, New Orleans, La.

[21] Appl. No.: 327,830

[22] Filed: Dec. 7, 1981

[51] Int. Cl.³ .............................................. G21C 7/32
[52] U.S. Cl. .................................. 376/211; 376/216; 376/246; 364/494; 60/644.1; 60/662; 60/667
[58] Field of Search ............... 376/210, 211, 216, 217, 376/245, 246; 60/644.1, DIG. 4, 662, 667; 364/492, 494

[56] References Cited

U.S. PATENT DOCUMENTS 4,104,117  8/1978  Parziale ............................... 376/211
4,330,367  5/1982  Musick ................................. 376/245

Primary Examiner—Donald P. Walsh
Attorney, Agent, or Firm—Vytas R. Matas; Robert J. Edwards

[57] ABSTRACT

A system for controlling the feedwater system in a nuclear power plant is disclosed. The system utilizes a logic calculations subsystem (50) which selects the operational mode of the system to be monitored from a plurality of operational modes. A disturbance estimate calculations subsystem (52) contains a dynamic mathematic model of the feedwater system and compares measured system variables with corresponding dynamic model variables contained therein to produce signals representative of deviations therebetween. A modified feedforward calculations subsystem (54) utilizes these signals and other system parameters as inputs to a steady-state mathematical model to produce control signals to determine valve positions and pump speeds so that the control valve flows, minimum control valve pressure drop, and feedwater pump flows are at their respective demanded values.

4 Claims, 2 Drawing Figures

NUCLEAR POWER PLANT FEEDWATER CONTROLLER DESIGN

TECHNICAL FIELD

The present invention relates generally to a feedwater controller for a nuclear power plant, and more particularly to a feedwater controller which has a multiplicity of operational modes to automatically control the components regulating the flow of feedwater within a typical feedwater system.

BACKGROUND ART

Typically, prior art feedwater control systems for nuclear power plants use a combination of feedwater pumps, control valves and steam generators. The feedwater pumps are usually connected in parallel and then each of these pumps is fluidically connected to a control valve which, in turn, is fluidically connected to a steam generator. In these systems, each of the control valves can be manually or automatically operated to obtain the demanded flow of feedwater to its respective steam generator. In this approach, the feedwater pumps can also be manually or automatically operated to minimize the pressure drops across the control valves. The primary problem with such a system is that if a control valve fails in the wide open position, the feedwater pumps speed up in an attempt to control the pressure drop across the failed valve. This results in excessive water being dumped into the steam generator which causes overcooling of the primary system if corrective measures are not taken.

Another problem that arises in nuclear power plants is that most physical phenomena which occur therein are only understood intuitively and arise out of a complex set of variables or conditions, and thus the resulting corrective measures might not be appropriate. For example, process structure changes resulting from pumps tripping, valves failing locked, etc., can result in different feedwater control requirements. Typically, the foregoing conditions are corrected by the operator of the system who uses his experience and intuition as to what remedial measures have to be taken. These remedial measures might not be proper and might result in further system instabilities.

Because of the foregoing, it has become desirable to develop a control system which regulates and controls the operation of a nuclear power plant feedwater system under a multiplicity of operational modes.

SUMMARY OF THE INVENTION

The present invention solves the aforementioned problems associated with the prior art as well as other problems by providing a control system to regulate the flow of feedwater in a nuclear power plant under a multiplicity of operational modes. The system is comprised of four subsystems, viz., a logic calculations subsystem, a disturbance estimate calculations subsystem, a modified feedforward calculations subsystem, and a proportional feedback calculations subsystem. The logic calculations subsystem selects the appropriate operational mode depending upon the status of the Hand/Automatic stations, the feedwater pumps and the control valves. The disturbance estimate calculations subsystem and the modified feedforward calculations subsystem both contain a mathematical model of the feedwater system; the disturbance estimate calculations subsystem having a dynamic model of the feedwater system and the modified feedforward calculations subsystem containing a steady state model derived from the dynamic model. The disturbance estimate calculations subsystem produces outputs indicative of the deviations of measured system variables (valve flows, pump flows, and flows to steam generator) from the dynamic model variables. The foregoing outputs (disturbance estimates) are utilized as inputs to the modified feedforward calculations subsystem to produce control signals to determine valve positions and pump speeds to place the control valve flows, the minimum control valve pressure drop, and the feedwater pump flows at their respective demanded values. The disturbance estimates are also utilized to modify the feedforward calculations, and thus the feedforward control signals, until the feedwater system variables approach their demanded values. The proportional feedback calculations subsystem modifies the natural dynamics of the overall system so as to obtain a faster response time

DESCRIPTION OF THE PREFERRED EMBODIMENT

Figure 1:
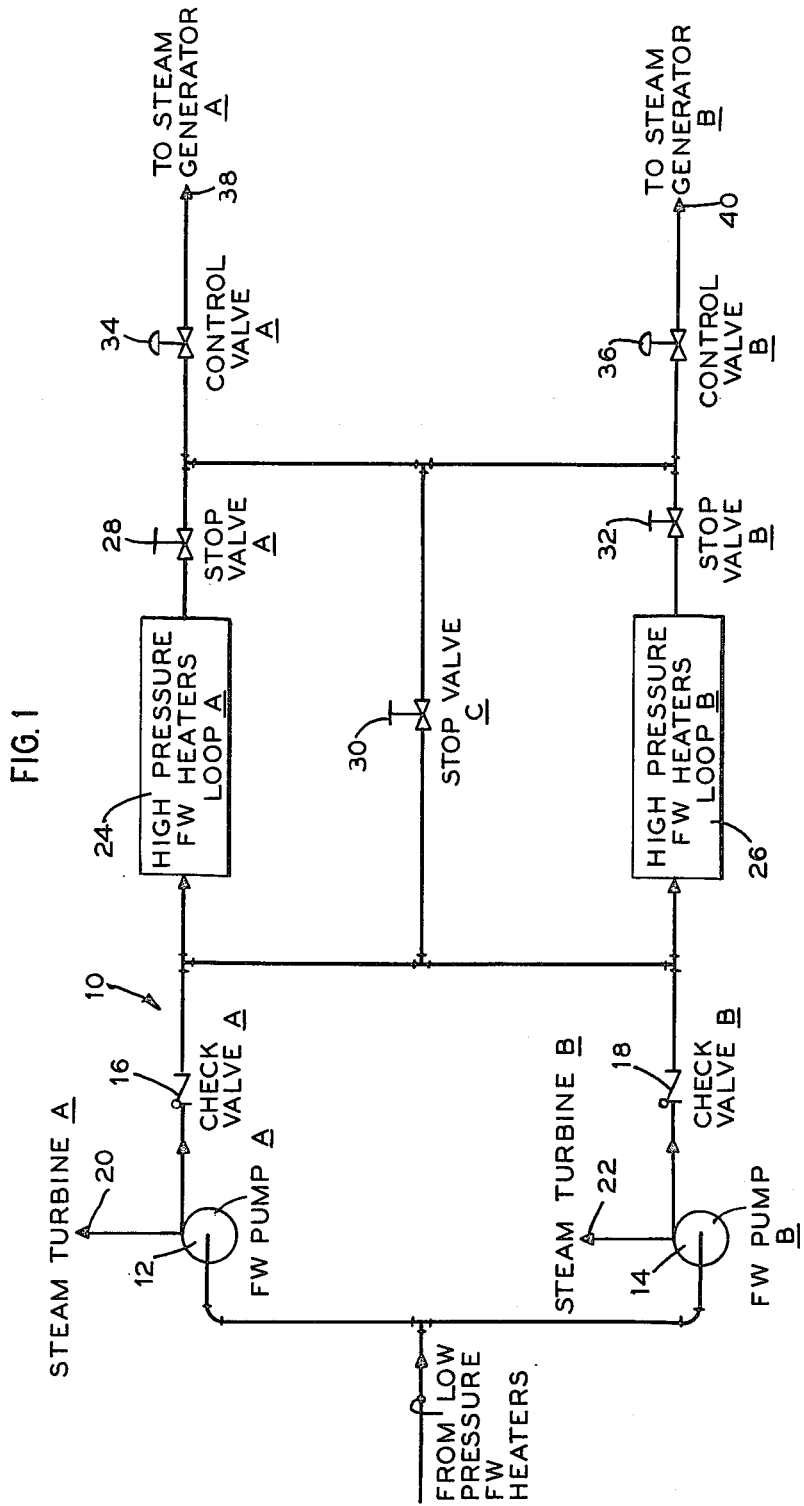
FIG. 1 is a schematic diagram of a prior art feedwater system for a nuclear power plant.

Referring now to the drawings where the illustrations are for the purpose of describing the preferred embodiment of the present invention and are not intended to limit the invention hereof, FIG. 1 illustrates a prior art feedwater system for a nuclear power plant. This system 10 is comprised primarily of a plurality of feedwater pumps 12, 14 each connected to check valves 16, 18 and driven by steam turbines 20, 22, respectively, high pressure feedwater heaters 24, 26, stop valves 28, 30, 32 and control valves 34, 36 connected to steam generators 38, 40, respectively.

In this prior art system, the feedwater from the low pressure feedwater heaters is applied to the inputs to both of the feedwater pumps 12, 14 which are driven by steam turbines 20, 22, respectively. The outputs of the feedwater pumps 12, 14 are connected to the inputs to check valves 16, 18, respectively which prevent reverse flow through the pumps and which, in turn, are connected to the inputs to the high pressure feedwater heater 24, 26 respectively. The outputs of the feedwater heaters 24, 26 are connected to the inputs to the stop valves 28, 32, respectively whose outputs are connected to the output of the stop valve 30 which is connected in parallel across the inputs to the feedwater heaters 24, 26. The output of the stop valves 28, 32 are also connected to the inputs of the control valves 34, 36, respectively whose outputs are connected to the steam generators 38, 40.

In this prior art system, the control valve 34 (valve A) is operated to allow the demanded flow of feedwater therethrough to the steam generator 38 (generator A), whereas the control valve 36 (valve B) is actuated to allow a similiar flow of feedwater therethrough to the steam generator 40 (generator B). In both instances, the feedwater pumps 12, 14 (pumps A, B respectively) are regulated to control the minimum of the pressure drops across the control valves 34, 36, respectively to a predetermined setpoint. One of the disadvantages of this system is that if one of the control valves 34, 36 has failed in the wide open position, the respective feedwater pumps 12, 14 speeds up trying to control the pressure drop across the failed valve to a predetermined setpoint. In this case, excessive feedwater would be dumped into the respective steam generator 38, 40 resulting in the overcooling of the primary system if proper manual controls are not initiated.

The invention of this disclosure involves a new design for a feedwater controller which has a multiplicity of modes of operation which are developed from process conditions and manual operation considerations and which are listed below:

1. In the normal condition, i.e., both control valves and feedwater pumps are operable and with all Hand/Automatic stations in the automatic position, the flow of feedwater through valves A, B is controlled and the pressure drops across the valves A, B is regulated so that the desired flows to the steam generators A, B occur and the pressure drops across the valves A, B are reduced to a predetermined setpoint, while the flow of feedwater through the feedwater pumps A, B is balanced.
2. In the normal condition and with both feedwater pumps A, B in the manual mode of operation, the flow of feedwater through the valves A, B is controlled so that the desired flows to the steam generators A, B occur.
3. In the normal condition and the feedwater pump A in the manual mode of operation, the flow of feedwater through the valves A, B is controlled and the pressure drops across the valves A, B are regulated so that the desired flows to the steam generators A, B occur and the pressure drops across the valves A, B are reduced to a predetermined setpoint.
4. In the normal condition and the feedwater pump B in the manual mode of operation, the flow of feedwater through the valves A, B is controlled and the pressure drops across the valves A, B are regulated so that the desired flow to the steam generators A, B occurs and the pressure drops across the valves A, B are reduced to a predetermined setpoint.
5. In the normal condition and with both control valves A, B in the manual position, the total flow of feedwater through the valves A, B is controlled so that the operator specified desired flows to the steam generators A, B occurs and the flows through the feedwater pumps A, B are balanced.
6. In the normal condition and with control valve A in the manual position, the flow of feedwater through the valves A, B is controlled so that the operator specified flow to the steam generator A occurs while the desired flow to the steam generator B occurs, while the flows through the feedwater pumps A, B are balanced.
7. In the normal condition and with control valve B in the manual position, the flow of feedwater through the valves A, B is controlled so that the desired flow to the steam generator A occurs while the operator specified flow to the steam generator B occurs, and the flows through the feedwater pumps A, B are balanced.
8. In the normal condition and with feedwater pump A in the manual mode of operation and control valve A in the manual position, the flow of feedwater through valves A, B is controlled so that the operator specified flow to the steam generator A occurs while the desired flow to the steam generator B occurs.
9. In the normal condition and with feedwater pump A in the manual mode of operation, and control valve B in the manual position, the flow of feedwater through valves A, B is controlled so that the desired flow to the steam generator A occurs while the operator specified flow to the steam generator B occurs.
10. In the normal condition and with feedwater pump B in the manual mode of operation and control valve A in the manual position, the flow of feedwater through valves A, B is controlled so that the operator specified flow to the steam generator A occurs while the desired flow to the steam generator B occurs.
11. In the normal condition and with feedwater pump B in the manual mode of operation and control valve B in the manual position, the flow of feedwater through valves A, B is controlled so that the desired flow to the steam generator A occurs while the operator specified flow to the steam generator B occurs.
12. With feedwater pump A tripped and all Hand/Automatic stations in the automatic position, the flow of feedwater through valves A, B is controlled and the pressure drops across the valves A, B are regulated so that the desired flows to the steam generator A, B occur and the pressure drops across the valves A, B are reduced to a predetermined setpoint.
13. With feedwater pump A tripped and valve A in the manual position and feedwater pump B in the manual mode of operation, the flow of feedwater through valve B is controlled so that the desired flow to the steam generator B occurs.
14. With feedwater pump A tripped and valve B in the manual position and feedwater pump B in the manual mode of operation, the flow of feedwater through valve A is controlled so that the desired flow to the steam generator A occurs.
15. With feedwater pump A tripped and valve A in the manual position, the flow of feedwater through the valves A, B is controlled so that the operator specified flow to the steam generator A occurs while the desired flow to the steam generator B occurs.
16. With feedwater pump A tripped and valve B in the manual position, the flow of feedwater through the valves A, B is controlled so that the desired flow to the steam generator A occurs while the operator specified flow to steam generator B occurs.
17. With feedwater pump A tripped and feedwater pump B in the manual mode of operation, the flow of feedwater through the valves A, B is controlled so that the desired flows to the steam generators A, B occur.
18. With feedwater pump B tripped and all Hand/Automatic stations in the automatic position, the flow of feedwater through valves A, B is controlled and the pressure drops across the valves A, B are regulated so that the desired flows to the steam generators A, B occur and the pressure drops across the valves A, B are reduced to a predetermined setpoint.
19. With feedwater pump B tripped and value A in the manual position and feedwater pump A in the manual mode of operation, the flow of feedwater through valve B is controlled so that the desired flow to the steam generator B occurs.
20. With feedwater pump B tripped and valve A in the manual position and feedwater pumps A in the manual mode of operation, the flow of feedwater through valve A is controlled so that the desired flow to the steam generator A occurs.
21. With feedwater pump B tripped and valve A in the manual position, the flow of feedwater through the valves A, B is controlled so that the operator specified flow to the steam generator A occurs while the desired flow to steam generator B occurs.
22. With feedwater pump B tripped and valve B in the manual position, the flow of feedwater through the valves A, B is controlled so that the desired flow to the steam generators A occurs, while the operator specified flow to steam generator B occurs.
23. With feedwater pump B tripped and feedwater pump A in the manual mode of operation, the flow of feedwater through the valves A, B is controlled so that the desired flows to the steam generators A, B occur.
24. With valve A failed in the wide open/locked position and with all Hand/Automatic stations in the automatic position, the flow of feedwater through the valves A ,B is controlled so that the desired flows to the steam generators A, B occur, while the flows through the feedwater pumps A, B are balanced.
25. With valve A failed in the wide open/locked position and with both feedwater pumps A, B in the manual mode of operation, the flows are balanced so that the flows through valve A equals the flow through valve B.
26. With valve A failed in the wide open/locked position and with valve B in the manual position, the flow of feedwater through valve A is controlled so that the desired flow to the steam generator A occurs and the flows through the feedwater pumps A, B are balanced.
27. With valve A failed in a wide open/locked position and with valve B in the manual position and feedwater pump A in the manual mode of operation, the flow of feedwater through valve A is controlled so that the desired flow to the steam generator A occurs.
28. With valve A failed in a wide open/locked position and with valve B in the manual position and feedwater pump B in the manual mode of operation, the flow of feedwater through the valve A is controlled so that the desired flow to the steam generator A occurs.
29. With valve A failed in a wide open/locked position and with feedwater pump A in the manual mode of operation, the flow of feedwater through the valves A, B is controlled so that the desired flows to the steam generators A, B occur.
30. With valve A failed in a wide open/locked position and with feedwater pump B in the manual mode of operation, the flow of feedwater through the valves A, B is controlled so that the desired flows to the steam generators A, B occur.
31. With valve B failed in a wide open/locked position and with all Hand/Automatic stations in the automatic position, the flow of feedwater through the valves A, B is controlled so that the desired flows to the steam generators A, B occur, and the flows through the feedwater pumps A, B are balanced.
32. With valve B failed in a wide open/locked position and with feedwater pumps A, B in the manual mode of operation, the flows are balanced so that the flow through valve A equals the flow through valve B.
33. With valve B failed in a wide open/locked position and with valve A in the manual position, the flow of feedwater through valve B is controlled so that the desired flow to the steam generator B occurs and the flows through the feedwater pumps A, B are balanced.
34. With valve B failed in a wide open/locked position and with valve A in the manual position and feedwater pump A in the manual mode of operation, the flow of feedwater through valve B is controlled so that the desired flow to the steam generator B occurs.
35. With valve B failed in a wide open/locked position and with valve A in the manual position and feedwater pump B in the manual mode of operation, the flow of feedwater through valve B is controlled so that the desired flow to the steam generator B occurs.
36. With valve B failed in the wide open/locked position and with feedwater pump A in the manual mode of operation, the flow of feedwater through the valves A, B is controlled so that the desired flow to the steam generators A, B occur.
37. With valve B failed in the wide/locked position and with feedwater pump B in the manual mode of operation, the flow of feedwater through the valves A, B is controlled so that the desired flows to the steam generators A, B occur.
38. With feedwater pump A tripped and with valve A failed in the wide open/locked position, the flow of feedwater through the valves A, B is controlled so that the desired flows to the steam generators A, B occur.
39. With feedwater pump A tripped, valve A failed in the wide open/locked position, and with feedwater pump B in the manual mode of operation, the flows are balanced so that the flow through valve A equals the flow through valve B.
40. With feedwater pump A tripped, valve A failed in the wide open/locked position, and with valve B in the manual position, the flow of feedwater through valve A is controlled so that the desired flow to the steam generator A occurs.
41. With feedwater pump A tripped and with valve B failed in the wide open/locked position, the flow of feedwater through the valves A, B is controlled so that the desired flows to the steam generators A, B occur.
42. With feedwater pump A tripped, with valve B failed in the wide open/locked position, and with feedwater pump B in the manual mode of operation, the flows are balanced so that the flow through valve A equals the flow through valve B.
43. With feedwater pump A tripped, with valve B failed in the wide open/locked position, and with valve A in the manual position, the flow of feedwater through valve B is controlled so that the desired flow to the steam generator B occurs.
44. With feedwater pump B tripped and with valve A failed in a wide open/locked position, the flow of feedwater through the valves A, B is controlled so that the desired flows to the steam generators A, B occur.

45. With feedwater pump B tripped, with valve A failed in the wide open/locked position, and with feedwater pump A in the manual mode of operation, the flows are balanced so that the flow through valve A equals the flow through valve B.

46. With feedwater pump B tripped, with valve A failed in the wide open/locked position, and with valve B in the manual position, the flow of feedwater through valve A is controlled so that the desired flow to the steam generater A occurs.

47. With feedwater pump B tripped and with valve B failed in the wide open/locked position, the flow of feedwater through the valves A, B is controlled so that the desired flows the steam generators A, B occur.

48. With feedwater pump B tripped, with valve B failed in the wide open/locked position, and with feedwater pump A in the manual position, the flows are balanced so that the flow through valve A equals the flow through valve B.

49. With feedwater pump B tripped, with valve B failed in the wide open/locked position, and with valve A in the manual position, the flow of feedwater through valve B is controlled so that the desired flow to the steam generator B occurs.

Figure 2:
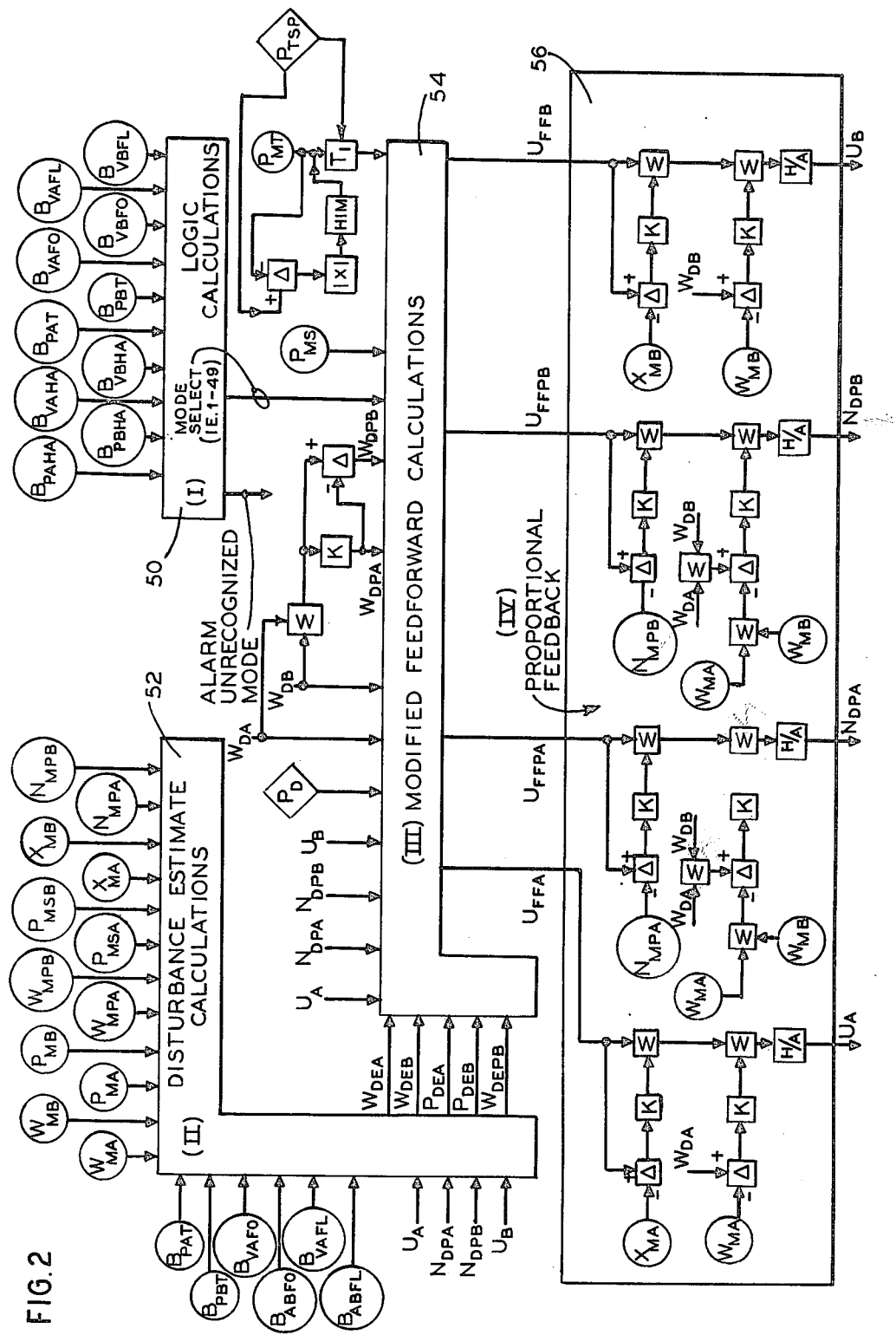
FIG. 2 is a schematic diagram of the subsystems comprising the new design for the feedwater controller disclosed herein.

The feedwater control system that provides the foregoing mode of operation is shown in FIG. 2 and is comprised primarily of four subsystems, viz., logic calculations subsystem 50, disturbance estimate calculation subsystem 52, modified feedfoward calculations subsystem 54, and proportional feedback calculations subsystem 56. The input and output symbols used in FIG. 2 are as follows:

$B_{PAHA} = 1$ implies that the Hand/Automatic Station for feedwater pump A is in the Hand position.
$B_{PBHA} = 1$ implies that the Hand/Automatic Station for feedwater pump B is in the Hand position.
$B_{VAHA} = 1$ implies that the Hand/Automatic Station for control valve A is in the Hand position.
$B_{VBHA} = 1$ implies that the Hand/Automatic Station for control valve B is in the Hand position.
$B_{PAT} = 1$ implies that feedwater pump A is tripped.
$B_{PBT} = 1$ implies that feedwater pump B is tripped.
$B_{VAFO} = 1$ implies that control valve A is failed in a wide open position.
$B_{VBFO} = 1$ implies that control valve B is failed in a wide open position.
$B_{VAFL} = 1$ implies control valve A is failed in a locked position.
$B_{VBFL} = 1$ implies control valve B is failed in a locked position.
$N_{DPA}$ = desired speed of feedwater pump A.
$N_{DPB}$ = desired speed of feedwater pump B.
$N_{MPA}$ = measured speed of feedwater pump A.
$N_{MPB}$ = measured speed of feedwater pump B.
$P_D$ = setpoint to which the pressure drops across valves A and B is to be minimized.
$P_{PEA}$ = pressure drop disturbance estimate for control valve A.
$P_{PEB}$ = pressure drop disturbance estimate for control valve B.
$P_{MA}$ = measured press drop across control valve A.
$P_{MB}$ = measured press drop across control valve B.
$P_{MS}$ = measured suction pressure at feedwater pumps A, B.
$P_{MT}$ = measured throttle pressure.
$P_{TSP}$ = throttle pressure setpoint.
$U_A$ = desired normalized position of control valve A.
$U_B$ = desired normalized position of control valve B.
$U_{FFA}$ = modified feedfoward control signal for control valve A.
$U_{FFPA}$ = modified feedfoward control signal for feedwater pump A.
$U_{FFPB}$ = modified feedfoward control signal for feedwater pump B.
$W_{DA}$ = desired flow to steam generator A.
$W_{DB}$ = desired flow to steam generator B.
$W_{DPA}$ = desired flow through pump A.
$W_{DPB}$ = desired flow through pump B.
$W_{DEA}$ = disturbance estimate associated with flow to steam generator A.
$W_{DEB}$ = disturbance estimate associated with flow to steam generator B.
$W_{DEPA}$ = disturbance estimate associated with flow through feedwater pump A.
$W_{DEPB}$ = disturbance estimate associated with flow through feedwater pump B.
$W_{MA}$ = measured flow to steam generator A.
$W_{MB}$ = measured flow to steam generator B.
$W_{MPA}$ = measured flow through feedwater pump A.
$W_{MPB}$ = measured flow through feedwater pump B.
$X_{MA}$ = measured normalized valve position of control valve A.
$X_{MB}$ = measured normalized valve position of control valve B.
$U_{FFB}$ = modified feelforward control signal for control valve B.

The logic calculation subsystem 50 selects the appropriate mode of operation for the feedforward calculations, with one mode corresponding to each of the previously enumerated 49 modes of operation. The mode selected depends upon the status of the Hand/Automatic stations, whether or not the feedwater pumps A, B are tripped, or whether or not the control valves A, B are failed in a wide open or locked condition. If the system mode does not fall into one of the foregoing 49 modes of operation, an alarm is generated indicating to the system operator that the system mode is not in one of the recognized modes of operation and the automatic control system takes no action. This alarm feature is not available in the current state-of-the-art controllers, and provides additional information to the system operator to assist him in taking timely corrective action.

The calculations performed by the disturbance estimate calculations subsystem 52 and the modified feedforward calculations subsystem 54 are based upon a mathematical model of the complete feedwater system. A dynamic mathematiccal model is utilized in the disturbance estimate calculation subsystem 52 and a steady state model is employed in the modified feedforward calculation subsystem 54. The steady state model utilized in this latter subsystem is derived from the dynamic model by setting all of the derivatives in the dynamic model equal to zero.

The control signals that are applied to the feedwater system actuators, viz., the desired normalized position of control valve A ($U_A$), the desired speed of feedwater pump A ($N_{DPA}$), the desired normalized position of control valve B ($U_B$) and desired speed of feed water-pump B ($N_{DPB}$), and the known disturbances, viz., measured suction pressure at the feedwater pumps A, B ($P_{MS}$) and measured throttle pressure ($P_{MT}$), that affect the feedwater system are inputs to the disturbance estimate calculations subsystem 52. Other inputs to the disturbance estimate calculation subsystem are the Boolean logic functions and the measured feedwater system variables. The logic inputs cause structural changes in the dynamic model calculations which correspond to the structural changes in the feedwater system, whereas the measured feedwater system variables are compared to their corresponding dynamic model variables and this comparison results in the generation of disturbance estimate outputs by the disturbance estimate calculations subsystem 52.

When the outputs of the dynamic mathematical model contained within the disturbance estimate calculations subsystem 52 are in agreement with the feedwater system measurement inputs, the disturbance estimate calculations remain unchanged. If, however, there is a difference between the model calculated outputs in the disturbance estimate calculations subsystem 52 and the corresponding measured process variables, then the disturbance estimate will vary in a manner so as to cause the model calculated outputs to approach the process measurements. A conventional proportional-integral controller within the disturbance estimate calculation subsystem is utilized to cause the model calculated outputs to approach agreement with the corresponding process measurements. In addition, in a steady-state condition, the disturbance estimates take on values which cause the model calculated outputs of the disturbance estimate calculation subsystem 52 to be equal to their corresponding measured process variables.

In the modified feedforward calculation subsystem 54, the steady state model of the feedwater system, which is derived from the dynamic model utilized by disturbance estimate calculation subsystem by setting all of the derivatives in the dynamic model equal to zero, produces control signals for determining valve positions and pump speeds required to place the control valve flows, minimum control valve pressure drop, and the feedwater pump flows at their respective demanded valves of $W_{DA}$, $W_{DB}$, $P_D$, $W_{DPA}$ and $W_{DPB}$. These output control signals are the modified feedforward control signals for valves A and B, respectively ($U_{FFA}$ and $U_{FFB}$), and the modified feedwater control signals for feedwater pumps A and B, respectively ($U_{FFPA}$ and $U_{FFPB}$). If any of the Hand/Automatic stations are in the manual position, then the operator demanded values for the normalized position of control valve A ($U_A$), the normalized position of control valve B ($U_B$), the desired speed of feedwater pump A ($N_{DPA}$), and the desired speed of feedwater pump B ($N_{DPB}$), which are inputs to the modified feedforward calculations subsystem 54, are transformed into the demanded control valve flows ($W_{DA}$, $W_{DB}$) and demanded feed water pump flows ($W_{DPA}$, $W_{DPB}$) and used by the modified feedforward calculations subsystem 54 in the calculations accomplished therein.

The measured feedwater pump suction pressure ($P_{MS}$) and the throttle pressure ($P_{MT}$) are also inputs to the modified feedforward calculations subsystem 54. If the throttle pressure does not deviate significantly from the setpoint, then the throttle pressure setpoint is utilized in the calculations undertaken in the modified feedforward calculations subsystem 54. However, if the throttle pressure deviates from the setpoint by a predetermined amount, the actual throttle pressure is utilized in the foregoing feedforward calculations. The foregoing procedure helps minimize interactions between the throttle pressure controller and the feedwater controller.

The calculations undertaken by the modified feedforward calculations subsystem 54 are categorized as "modified" feedforward calculations because the unknown disturbance estimates, viz., the disturbance estimate associated with the flow to steam generator A ($W_{DEA}$), the disturbance estimate associated with the flow to steam generator B ($W_{DEB}$), the pressure drop disturbance estimate for control valve A ($P_{DEA}$), the pressure drop disturbance estimate for a control valve B ($P_{DEB}$), and the disturbance estimate associated with the flow through feedwater pump B ($W_{DEPB}$) are utilized in the feedforward calculation. If the model of the feedwater system is perfect, then the calculated feedforward control signals will be those required to place the feedwater system variables at their demanded values. If there are inaccuracies in the feedwater system model, the disturbance estimates are used to modify the feedforward calculations and the feedforward control signals, until the feedwater system variables approach their corresponding demanded values.

The proportional feedback calculations subsystem 56 is comprised of simple loop controllers implemented with conventional analog or digital controllers. These loop controllers are tuned to modify the natural dynamics of the overall system so as to obtain faster response time.

The foregoing feedwater controller provides numerous advantages over the prior art systems, some of which are as follows:

(1) The control valve flows are controlled automatically to their reference values even when one of the valves fails in a wide open or locked position. In the prior art systems, if a control valve failed in the wide open position, the feedwater pumps would speed up trying to control the pressure drop across the failed valve. The result of this action would be that excessive water would be dumped into the steam generator and overcooling of the primary system would occur.

(2) The flows through the feedwater pumps can be balanced automatically to any ratio.

(3) Since measurements of feedwater pump suction pressure and turbine throttle pressure are utilized in the feedforward throttle calculations, improved system performance occurs during large deviations in system pressure caused by turbine trips and condensate or heater drain pump trips.

(4) The placing of a valve or pump in the manual mode of operation results in the operator demanded flow through the pump or valve being used in the control calculations to determine the position of the other respective actuators.

(5) The feedforward algorithm and the disturbance estimate algorithm are derived from a mathematical model rather than mere "intuitive feel" which is utilized by the prior art systems and which can result in incorrect control actions under unanticipated conditions.

(6) This feedwater controller system considers and calculates the effect of unknown disturbances within the system and means for taking corrective action to correct the disturbance are designed into the system structure.

Certain modifications and improvements of this system will occur to those skilled in the art upon reading the foregoing. It should be understood that all such modification and improvements have been deleted herein for the sake of conciseness and readability but are properly within the scope of the following claims.

I claim:

1. A control system for regulating the operation of the components within a power plant feedwater system having various operating modes comprising means for selecting and monitoring the particular mode of operation existing at a specific time from a multiplicity of specific operating modes for the feedwater system, said particular operating mode being dependent upon the operating status of the components within the feedwater system, means for comparing measured feedwater system variables with corresponding predetermined system variables for said particular operating mode, said comparing means producing signals representative of the differences between said measured feedwater system variables and said correspondeing predetermined system variables for said particular operating mode, and means for producing control signals in response to said signals produced by said comparing means, said control signals being utilized to regulate the operation of the feedwater system components to control the flow of feedwater therethrough.

2. The control system as defined in claim 1 wherein said comparing means is comprised of a dynamic mathematical model of the operating characteristics of the feedwater system.

3. The control system as defined in claim 2 wherein said control signal producing means is comprised of a steady state mathematical model derivedfrom said dynamic mathematical model.

4. The control system as defined in claim 1 further including alarm means actuatable when said selecting and monitoring means selects a mode of operation other than a mode contained within said multiplicity of specific operating modes.

* * * * *